United States Patent [19]
Takahashi et al.

[11] 3,988,654
[45] Oct. 26, 1976

[54] MINIATURE BRUSHLESS MOTOR

[75] Inventors: Tadashi Takahashi; Kazuo Onishi; Mituru Sato, all of Hitachi; Junshiro Inamura, Kodaira, all of Japan

[73] Assignee: Hitachi, Ltd., Japan

[22] Filed: Dec. 17, 1974

[21] Appl. No.: 533,702

[30] Foreign Application Priority Data
Dec. 21, 1973 Japan.............................. 48-142478

[52] U.S. Cl. ................................................ 318/254
[51] Int. Cl.² ........................................ H02K 29/00
[58] Field of Search .......................... 318/138, 254

[56] References Cited
UNITED STATES PATENTS

| | | | |
|---|---|---|---|
| 3,159,777 | 12/1964 | Manteuffel.......................... | 318/138 |
| 3,549,967 | 12/1970 | Uemura........................... | 318/254 X |
| 3,864,610 | 2/1975 | Kawamoto et al............... | 318/254 X |

*Primary Examiner*—Gene Z. Rubinson
*Attorney, Agent, or Firm*—Craig & Antonelli

[57] ABSTRACT

A miniature brushless motor in which driving coils and magnetically responsive elements such as Hall elements are disposed around a permanent magnet rotor. An output appears from the successive Hall elements detecting the rotating position of the permanent magnet rotor so as to control the current supplied to the driving coils. In the brushless motor, the portion of the permanent magnet rotor opposed to the Hall elements is magnetized through an angle which is selected to be smaller than the angle through which the rotor portion opposed to the driving coils is magnetized.

5 Claims, 6 Drawing Figures

MINIATURE BRUSHLESS MOTOR

BACKGROUND OF THE INVENTION

1. Field of the Invention

This invention relates to a brushless motor in which a plurality of magnetically responsive elements such as Hall elements are used to detect the rotating position of a permanent magnet rotor driven by driving coils.

2. Description of the Prior Art

In conventional motors of this kind, a plurality of driving coils are disposed in an equally circumferentially spaced relationship around a permanent magnet rotor securely mounted on a shaft for rotation, and a plurality of magnetically responsive elements, for example, Hall elements are disposed opposite to the outer periphery of the permanent magnet rotor for detecting the rotating position of the rotor.

The driving coils are connected to a d.c. power source through respective control transistors. The Hall elements are also connected to the d.c. power source for the on-off control of the control transistors by the electromotive force induced in the Hall elements.

When the north pole (or south pole) of the permanent magnet rotor is brought to the position opposite to a first Hall element with the rotation of the rotor, a voltage is induced in the first Hall element and the first control transistor connected thereto is turned on to energize the associated driving coil. The permanent magnet rotor is thus urged further in the rotating direction by the driving force imparted by the driving coil until the north pole (or south pole) thereof is brought to the positive opposite to a second Hall element. As a result, a voltage is induced in this second Hall element, and the second control transistor connected to the second Hall element is turned on. At this time, the output voltage of the first Hall element is reduced and the first control transistor is cut off. In this manner, the driving coils are successively energized to cause continuous rotation of the permanent magnet rotor.

In such a brushless motor, there is an important relation between the angle of magnetization of the permanent magnet rotor and the conduction angle which is an angular representation of time, during which current is supplied to the driving coil.

Describing more specifically, the Hall element generates an output voltage whose characteristic is in accord with the density distribution of the magnetic flux produced by the permanent magnet rotor. Therefore, in order that the motor can operate with a high efficiency, the transistor is desirably turned on at the time when the density of the above-mentioned flux is substantially maximum, which means that the transistor is set so as to be turned on only when the output voltage of the Hall element is rather high. However, setting of the operating point for the transistor at such a high voltage value would result in an extremely unstable motor operation in view of the fact that the output voltage of the Hall element tends to be reduced to such an extent that sufficient current cannot be supplied to the driving coil through the transistor due to non-uniformity of the property of the Hall element and permanent magnet rotor and also due to temperature variations. It has therefore been difficult for the prior art motor of this kind to operate satisfactorily efficiently since the conduction angle of the driving coil is equal to or smaller than the angle of magnetization of the permanent magnet rotor.

SUMMARY OF THE INVENTION

It is an object of the present invention to provide a highly efficient miniature brushless motor in which a high density portion only of the magnetic flux produced by a permanent magnet rotor is utilized for operation.

Another object of the present invention is to provide a miniature brushless motor which can operate stably and efficiently without being adversely affected by external disturbance or by non-uniformity of the property of Hall elements and permanent magnet rotor or by temperature variations, due to the fact that the portion of the permanent magnet rotor opposed to the Hall elements is magnetized through an angle which is selected to be smaller than the angle through which the rotor portion opposed to driving coils is magnetized so that switching of transistors is advantageously effected upon appearance or disappearance of a signal produced by each Hall element when detecting the angular position of the rotor.

DESCRIPTION OF THE PREFERRED EMBODIMENT

Figure 1:
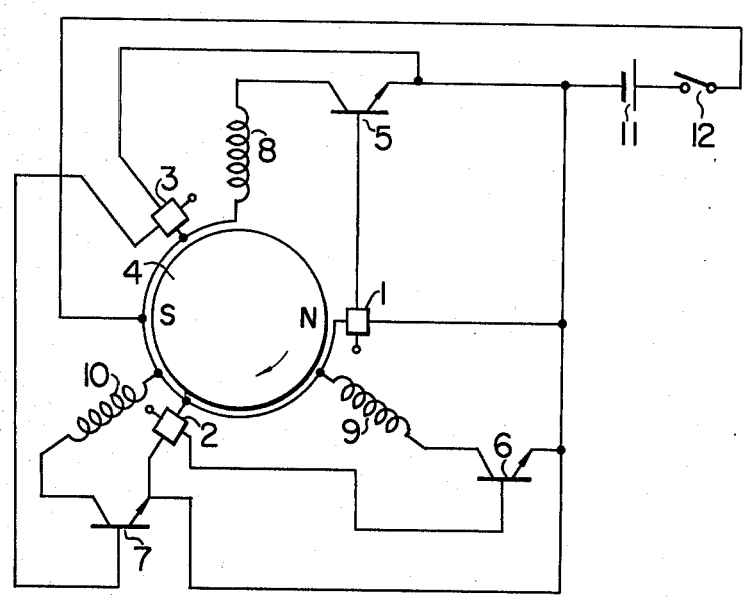
FIG. 1 is a basic circuit diagram of a miniature brushless motor according to the present invention.

Referring to FIG. 1, a plurality of magnetically responsive elements, for example, Hall elements 1 to 3 are disposed in an equally circumferentially spaced relationship around a permanent magnet rotor 4. These Hall elements 1 to 3 start to generate an output voltage when the magnetic pole, for example, the north pole of the permanent magnet rotor 4 approaches thereto. A plurality of transistors 5 to 7 are connected at the base thereof to the respective Hall elements 1 to 3 to be controlled by the latter. That is, the transistors 5 to 7 are turned on by the outputs of the respective Hall elements 1 to 3. These transistors 5 to 7 are connected at the collector thereof to one end of respective driving coils 8 to 10. The driving coils 8 to 10 are connected at the other ends thereof to the positive terminal of a d.c. power source 11 through an on-off switch 12. The transistors 5 to 7 are connected at the emitter thereof to the negative terminal of the d.c. power source 11.

Suppose that the switch 12 is turned on when the permanent magnet rotor 4 is such a motor is in the illustrated position. Then, a voltage is induced in the first Hall element 1, and the first transistor 5 connected to the output terminal of this Hall element 1 is turned on to supply current to the first driving coil 8. Due to the flow of current through the first driving coil 8, an electromagnetic force acts on the permanent magnet rotor 4 to cause the rotor 4 to rotate in a direction shown by the arrow in FIG. 1.

When the north pole of the permanent magnet rotor 4 rotating in the direction of the arrow approaches to the second Hall element 2, a voltage is induced in this Hall element 2 to turn on the second transistor 6. As a result, current is supplied to the second driving coil 9 to cause further rotation of the permanent magnet rotor 4 in the direction of the arrow. As the north pole of the permanent magnet rotor 4 moves away from the first Hall element 1, the output voltage of this Hall element 1 is gradually reduced until finally the first transistor 5 is cut off and no current is supplied to the first driving coil 8. In this manner, a voltage is induced successively in the Hall elements 1 to 3 and the driving coils 8 to 10 are successively energized by the transistors 5 to 7 to cause continuous rotation of the permanent magnet rotor 4 in the direction of the arrow.

Although FIG. 1 illustrates a three-phase two-pole motor, it is apparent that the same principle applies to an $n$-phase $m$-pole motor ($n$, $m$: integer).

Figure 2:
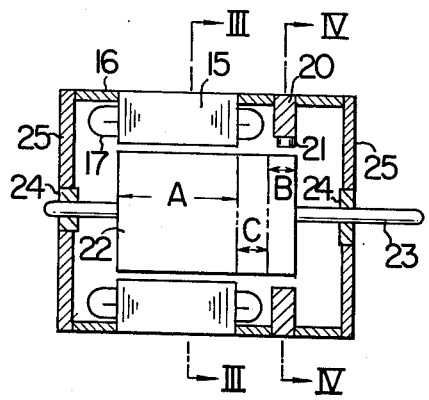
FIG. 2 is a schematic sectional view showing the structure of an embodiment of the miniature brushless motor of the present invention.

The structure of the motor according to the present invention will be described with reference to FIG. 2. Referring to FIG. 2, a plurality of driving coils 17 are carried by a driving stator 15 secured to a housing 16. A detecting stator 20 is secured also to the housing 16 and a plurality of Hall elements 21 are mounted on spaced portions of the inner periphery of this detecting stator 20. A permanent magnet rotor 22 is securely mounted on a shaft 23 which is journaled rotatably in bearings 24 fitted in aligned openings of end brackets 25.

Figure 3:
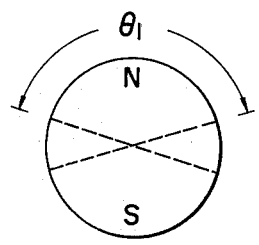
FIG. 3 is a section taken along line III — III in FIG. 2 to show the angle of magnetization of the magnetized portion A of the permanent magnet rotor.
Figure 4:
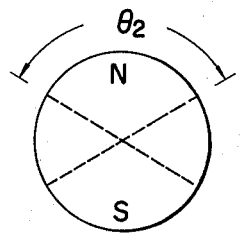
FIG. 4 is a section taken along line IV — IV in FIG. 2 to show the angle of magnetization of the magnetized portion B of the permanent magnet rotor.

The permanent magnet rotor 22 securely mounted on the rotary shaft 23 includes at least two magnetized portions. More precisely, the permanent magnet rotor 22 is magnetized at a first portion A opposed to the driving stator 15 having the driving coils 17 thereon and at a second portion B opposed to the detecting stator 20 having the position-detecting Hall elements 21 thereon. A third portion C between the first portion A and the second portion B of the permanent magnet rotor 22 is not magnetized so as to isolate the second portion B from the first portion A. As shown in FIG. 3 which is a section taken along the line III — III in FIG. 2, this first portion A is magnetized through a relatively large angle $\theta_1$ which may be, for example, 150°. Further, as shown in FIG. 4 which is a section taken on the line IV — IV in FIG. 2, the second portion B is magnetized through an angle $\theta_2$ which is smaller than the angle of magnetization $\theta_1$ of the first portion A. $\theta_2$ may be 120°, for example.

The insulating third portion C may be dispensed with if so desired so that the rotor 22 consists of the portions A and B adjacent to each other.

Figure 5:
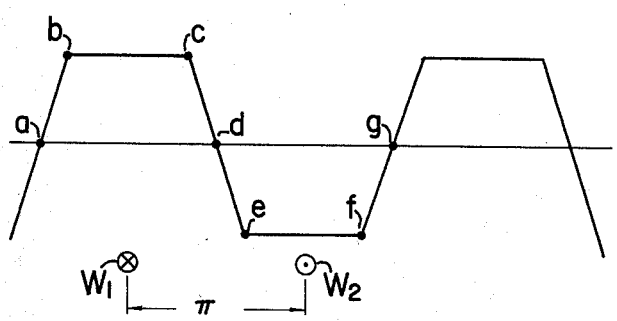
FIG. 5 shows the magnetic flux density distribution produced by the permanent magnet rotor relative to one of the driving coils in the motor of the present invention.

In the motor having such a structure, consider now the case in which the magnetic flux density distribution produced by the first portion A of the permanent magnet rotor 22 varies relative to the rotating angle of the rotor 22 in a manner as shown in FIG. 5.

In FIG. 5, $W_1$ and $W_2$ designate the windings of the driving coils 17 in the case in which the pitch thereof is selected to be equal to the pitch of the magnetic poles, and current flows through these windings in the illustrated directions. In the case of the winding $W_1$, the direction of torque remains the same in the half cycle starting from a point $a$ and ending at a point $d$, but the direction of torque is reversed in the region outside this half cycle. Further, the value of this torque is proportional to the values of current flowing in the driving coils and the density of magnetic flux produced by the rotor. In the range in which the winding $W_1$ is energized by the magnetic flux of high density between the points $b$ and $c$, a correspondingly large torque is produced with a constant current value.

However, a small torque is produced in the ranges between the points $a$ and $b$ and between the points $c$ and $d$ since the magnetic flux density starts to increase and decrease respectively in such ranges. Therefore, the efficiency is low in these ranges due to the fact that the torque value is small compared with the current value and the loss is large. It can be therefore known that a highly efficient motor can be obtained when the driving coils 17 for driving the permanent magnet rotor 22 having such a magnetic flux density distribution are energized during a period of time within the range of from the point $b$ to the point $c$.

In order to prepare a permanent magnet rotor such as rotor 22 having at least two magnetized portions, use may be made of any conventional magnetizing means such as described in an article entitled "Section 9.5 Multiple Magnet Magnetizing" on pp. 413 – 414 of "PERMANENT MAGNET AND MAGNETISM" by D. Hadfield, published in 1962 by John Wiley & Sons Inc., subject to any necessary modification. The portions A, B and C may be prepared separately; the portion including A and C and the portion B may be prepared separately; or the portion A and the portion including C and B may be prepared separately. The separately prepared portions are fixed to each other when mounted to the shaft. It is apparent that the portions A and B may be integrally formed by individually magnetizing a single magnetic cylinder to provide a rotor such as shown in FIG. 2.

Figure 6:
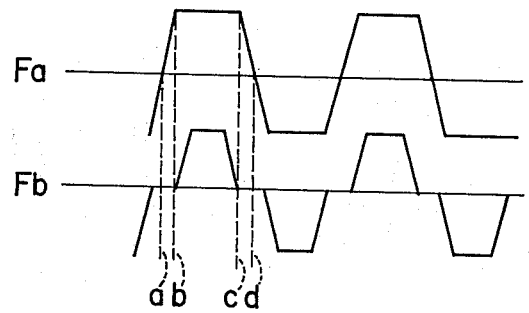
FIG. 6 shows the magnetic flux density distributions produced by the portions A and B of the permanent magnet rotor in the motor of the present invention.

According to the present invention, the angle of magnetization of the second portion B of the permanent magnet rotor 22 is selected to differ from that of the first portion A as shown in FIGS. 2 to 4. Thus, the magnetic flux density distribution produced by the first portion A relative to the rotating angle is as shown by $F_a$ in FIG. 6. On the other hand, the magnetic flux density distribution produced by the second portion B relative to the rotating angle is as shown by $F_b$ in FIG. 6 since the angle of magnetization $\theta_2$ is smaller than the angle of magnetization $\theta_1$. Accordingly, an output voltage proportional to the flux density distribution shown by $F_b$ in FIG. 6 appears from the position-detecting Hall elements 21 with the rotation of the permanent magnet rotor 22. Therefore, switching may be done at a low signal level (points $b$ and $c$ in FIG. 6) at which the detected position signal (that is, the output voltage of the Hall elements) is nearly zero. The motor can operate satisfactorily without any reduction in the efficiency due to the fact that the magnetic flux density due to the first portion A of the permanent magnet rotor 22 is sufficiently high at these points $b$ and $c$. Further, switching at such a low detected position signal level is advantageous in that the motor can operate stably without being adversely affected by non-uniformity of the property of the Hall elements and permanent magnet rotor and irrespective of temperature variations.

While the position detecting elements in the form of Hall elements have been described by way of example, it will be readily understood that the position detecting elements may be any other suitable ones sensitive to the magnetism and such ones can operate in entirely the same manner.

We claim:

1. A miniature brushless motor comprising a plurality of driving coils disposed around a permanent magnet rotor for driving said permanent magnet rotor, at least a first portion of said permanent magnet rotor which is located opposite to said driving coils being magnetized through a first magnetization angle, a plurality of magnetically responsive element means disposed around said permanent magnet rotor for detecting the rotating position of said permanent magnet rotor, and means for selectively supplying current to said driving coils under control of a signal supplied thereto upon detection of the rotational position of said permanent magnet rotor by said magnetically responsive element means, each said magnetically responsive element means generating said control signal to said selective means for supplying its associated driving coil with a current having a conduction angle smaller than the first magnetization angle of said first magnetized portion of said permanent magnet rotor.

2. A miniature brushless motor as claimed in claim 1, wherein said permanent magnet rotor is supported rotatably opposite to both said driving coils and said magnetically responsive element means and comprises said first magnetized portion located opposite to said driving coils and a second magnetized portion located opposite to said magnetically responsive element means, said second magnetized portion being magnetized through second magnetization angle smaller than the first magnetization angle.

3. A miniature brushless motor comprising a permanent magnet rotor, a plurality of driving coils disposed around said rotor, a plurality of magnetically responsive element means disposed proximate to said rotor for detecting the rotating position of said rotor, and means connected with said magnetically responsive element means for selectively energizing said driving coils depending upon the ouputs of said magnetically responsive element means, said permanent magnet rotor having a first magnetized portion magnetized through a first magnetization angle for interaction with said selectively energized driving coils and a second magnetized portion magnetized through a second magnetization angle for selective activation of said magnetically responsive element means, the first magnetization angle of said first magnetized portion being larger than the second magnetization angle of said second magnetized portion.

4. A miniature brushless motor as claimed in claim 3, in which said permanent magnet rotor has a third portion for isolating said first and second magnetized portions, said first, second and third portions being united with one another.

5. A miniature brushless motor as claimed in claim 3, in which said magnetically responsive element means are Hall Effect elements.

* * * * *